United States Patent [19]
Elsas

[11] 3,891,245
[45] June 24, 1975

[54] LUGGAGE TROLLEYS

[75] Inventor: Tibor Elsas, London, England

[73] Assignee: Norland Gazelle Travel Goods Limited, Middlesex, England

[22] Filed: May 17, 1973

[21] Appl. No.: 361,369

[30] Foreign Application Priority Data
May 17, 1972 United Kingdom............... 23090/72

[52] U.S. Cl........................................ 280/47.13 R
[51] Int. Cl............................................. B62b 1/12
[58] Field of Search................ 280/47.13 R, 47.17; 190/18 A

[56] References Cited
UNITED STATES PATENTS
1,413,852  4/1922  Hokkanen.................... 280/47.13 R
2,478,563  8/1949  Book........................... 280/47.17 X FOREIGN PATENTS OR APPLICATIONS
84,211   1/1957  Netherlands................. 280/47.13 R
352,577  4/1961  Switzerland................. 280/47.13 R Primary Examiner—David Schonberg
Assistant Examiner—John A. Pekar
Attorney, Agent, or Firm—Brisebois & Kruger

[57] ABSTRACT

A trolley for attachment to the corner of a suitcase or the like, for example by means of straps comprises a support assembly which is suitably shaped to receive the suitcase and a chassis assembly including a pair of ground engaging wheels. In one form of trolley the assemblies are detachably connected together so that the chassis assembly including the wheels, can be removed while leaving the support assembly attached to the suitcase.

1 Claim, 7 Drawing Figures

LUGGAGE TROLLEYS

This invention relates to luggage trolleys which can be attached to luggage to provide a wheeled support therefor.

In accordance with the invention there is provided a trolley for attachment to a suitcase or the like to provide a support therefor, comprising an angled support assembly for attachment a corner of a suitcase, and a chassis assembly having a pair of ground-engaging wheels.

The support assembly may be fast with the subassembly to provide a rigid, unitary structure, but in a preferred embodiment the support assembly is detachably connected to the chassis assembly.

Two embodiments of a luggage trolley in accordance with the invention will now be described, by way of example, with reference to the accompanying drawings, in which.

Figure 1:
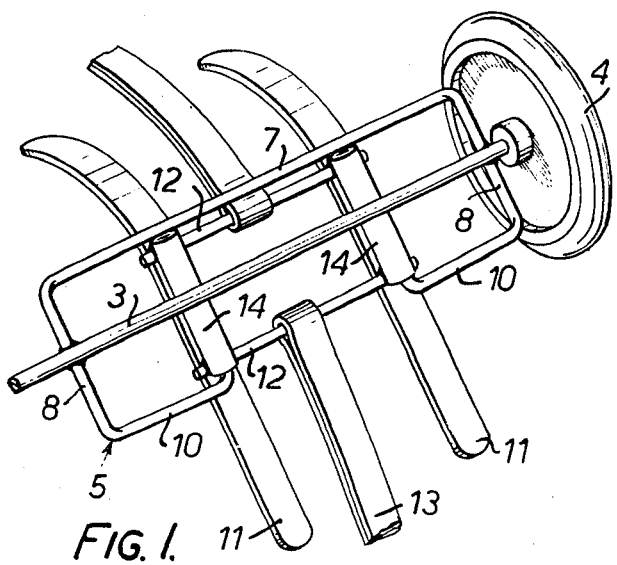
FIG. 1 is a perspective view of one embodiment of the luggage trolley.
Figure 4:
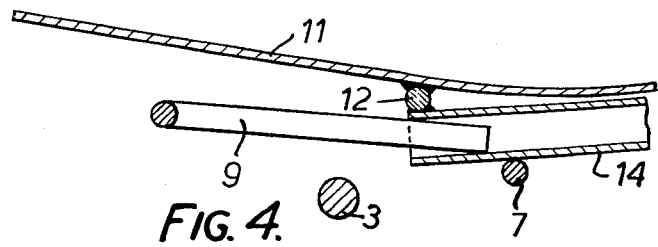
Figure 5:
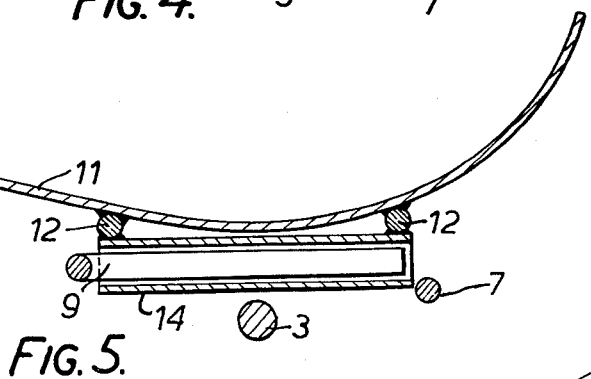
Figure 6:
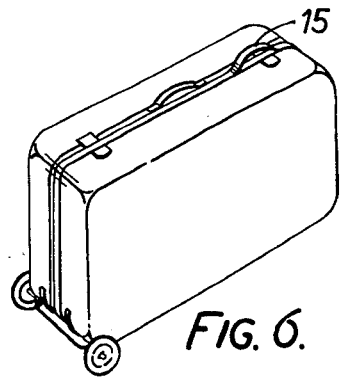
Figure 7:
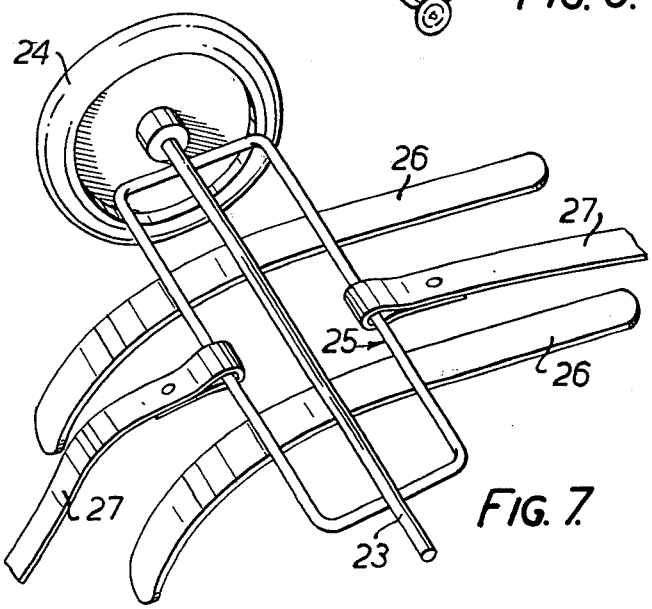

FIG. 4 is a section through a support bracket of the trolley of FIG. 1 with the chassis assembly and the support assembly in an initial position of connection, FIG. 5 is a section similar to that of FIG. 4 with the assemblies in their interconnected positions, FIG. 6 is a perspective view of the trolley of FIG. 1 attached to a suitcase, and FIG. 7 is a perspective view of the second embodiment of the luggage trolley.

Figure 2:
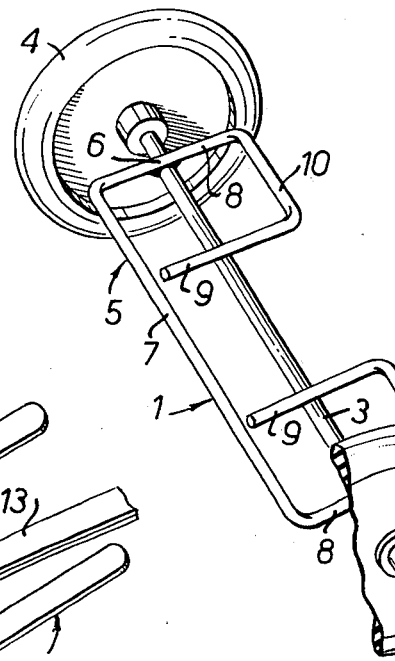
FIG. 2 is a perspective view of a chassis assembly of the trolley of FIG. 1.
Figure 3:
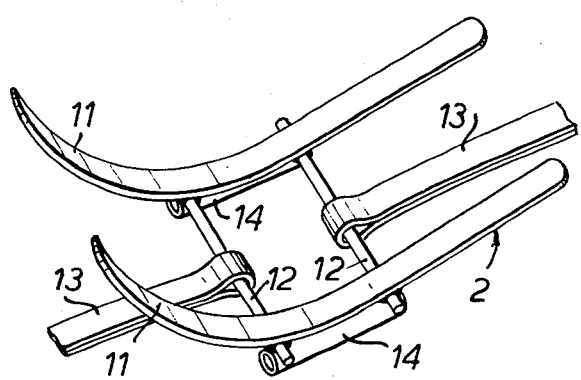
FIG. 3 is a perspective view of a support assembly of the trolley of FIG. 1.

Referring to FIGS. 1 to 3, the trolley comprises a chassis assembly 1 and a support assembly 2, which are detachably connected. The chassis assembly 1 comprises an axle 3 carrying a pair of wheels 4 and a generally rectangular frame member 5 welded to the axle at points 6. The frame member 5 comprises a straight side portion 7, intermediate portions 8 perpendicular thereto and contained in the same plane, the portions 8 being welded to the axle 3 at 6, end portions in the form of spigots 9 contained in a plane spaced from the above-mentioned plane, and sloping portions 10 joining the spigots 9 to the intermediate portions 8.

The support assembly 2 comprises a pair of spaced-apart support brackets 11 shaped to fit the corner of a suitcase and welded to frame members 12. The frame members 12 having straps 13 attached thereto for wrapping around the suitcase to hold the support assembly onto the suitcase. Tubular socket members 14 are welded to the frame members 12 beneath the respective support brackets.

The method of interconnecting the support assembly 2 and the chassis assembly 1 is illustrated in FIGS. 4 and 5. FIG. 4 shows the initial relative positions of one of the spigots 8 and one of the socket members 14 as the assemblies are being connected. The socket members 14 are pushed onto the free ends of the spigots 9 such that the resilience of the spigots pivots the socket members about the side portion 7 of the frame member 5. As the socket members are pushed further along the spigots a position is reached in which the socket members are no longer in contact with the side portion 7 and the resilience of the spigots moves the socket members to the position shown in FIGS. 1 and 5. In this position the socket members are held in position, movement in either direction causing abutment with the sloping portions 10 or the side portion 7 of the frame member 5. To release the support assembly 2, it is moved against the resilience of the spigots and pulled away therefrom so that the socket members again pivot on the side portion 7. The socket members are then pulled to the position shown in FIG. 4 while sliding across the side portion 7 and are finally released from the spigots.

FIG. 6 shows the method of attachment of the trolley to the suitcase. The straps 13 are wrapped around the suitcase and joined together, for example by means of a buckle. One of the straps conveniently has a handle 15 connected thereto which, in the assembled position shown, is positioned near the corner of the suitcase diagonally opposite the trolley.

The above-described trolley has the advantage that the support assembly 2 can readily be attached to a suitcase while the chassis assembly 1, which includes the wheels, is detached. In conventional one-piece luggage trolleys the wheels tend to slide away from the suitcase when the trolley is being attached and the suitcase is laid on the trolley for fastening the straps around the suitcase. Thus, attachment of the above-described trolley is much simpler than conventional trolleys.

Further, the chassis assembly is readily connected to and detached from the support assembly so that the suitcase is easily made ready for wheeling and/or stowing. When the suitcase is to be loaded, for example, into a car, the chassis assembly, including the wheels, can be detached to save space in the boot or to prevent damage to upholstery etc.

When loading on aircraft, conventional luggage trolleys must be completely removed from the suitcase at the air terminal and carried separately by the passenger. The above-described trolley has the advantage that only the chassis assembly has to be removed at the air terminal. Thus, at the destination it is very simple to merely re-attach the chassis assembly so that the suitcase is again ready for wheeling. The speed of re-attaching the chassis assembly at the destination is very important when a connecting bus or train has to be caught.

The second form of trolley shown in FIG. 7 is of rigid and simple construction and comprises an axle 23 carrying a pair of wheels 24. A frame 25 is welded to the axle 23 and a pair of spaced support brackets 26 is welded to the frame 25. A pair of straps 27 is attached to opposite arms of the frame 25 for attachment to a suitcase.

Known luggage trolleys have support brackets each of which comprises a pair of members hingedly interconnected at their ends so that they may be folded when not in use. The above-described second form of trolley has one-piece support brackets which are shaped to fit the contour of a corner of a suitcase and has the advantage that it is easier to attach to a suitcase than the known trolleys.

I claim:

1. A trolley for attachment to a corner of a suitcase to provide a support therefore, said trolley comprising an angled support assembly shaped to receive said corner of said suitcase, means for releasably securing said support assembly to said suitcase, a chassis assembly including a pair of ground-engaging wheels, and connecting means detachably securing said chassis assembly to said support assembly, said connecting means comprising inherently resilient projection means fast with said chassis assembly and socket means cooperating with said projection means and fast with said supporting assembly, and means for preventing disengagement of said cooperating projection means and socket means when said projection means and socket menas are fully engaged in a first position with said projecting means unstressed, wherein said projection means are movable against said inherent resilience to a second position clear of said means for preventing disengagement and in which said projection means and socket means can be disengaged to release said chassis assembly from said support assembly, said projection means comprising two parallel, spaced-apart projecting members which extend transversely of an axis of rotation of said ground-engaging wheels and which form part of a frame, and said socket means comprising a pair of correspondingly spaced-apart tubular socket members fast with said support assembly, and said means for preventing disengagement comprising a portion of said frame which is parallel with said axis of rotation of said ground engaging wheels, said frame portion being normally aligned with the ends of said socket members when said socket members and projection members are interengaged, said projection members being movable against said inherent resilience sufficiently to spring said socket members out of line with said frame portion to permit disengagement of said socket members and said projection members.

* * * * *